July 3, 1934.   P. R. ENGLER ET AL   1,964,847
KEYLESS LOCK
Original Filed June 4, 1932
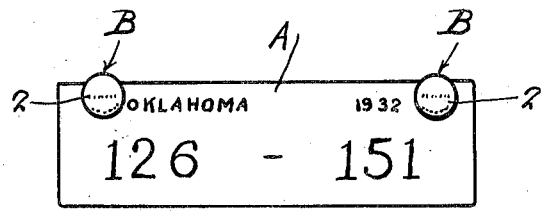
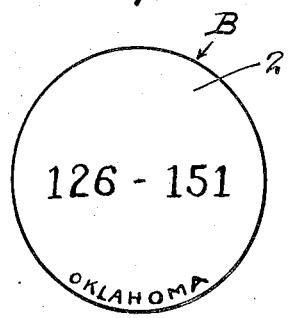
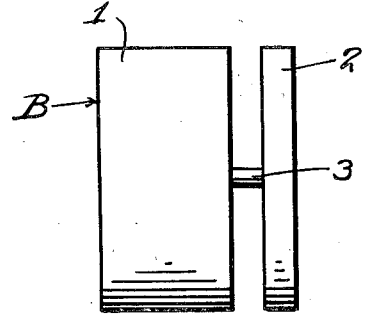
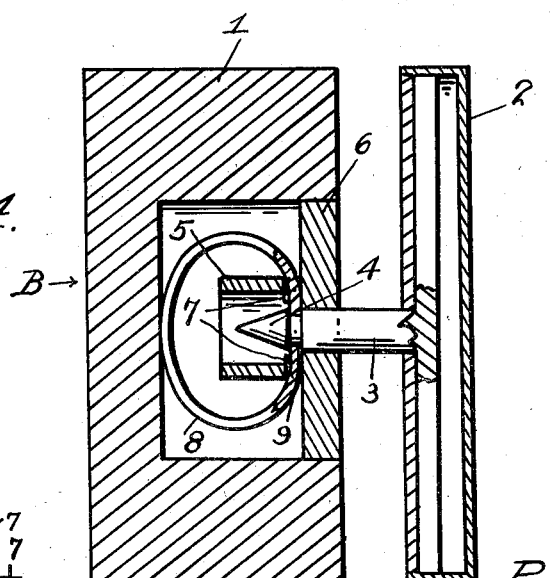
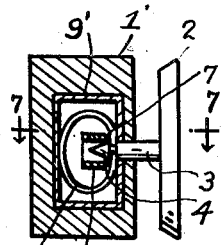
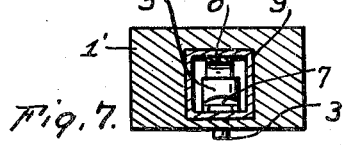
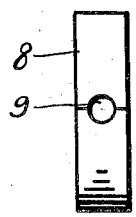
Inventor
P. R. Engler
and Donald P. Fries
By Clarence A. O'Brien
Attorney Patented July 3, 1934

1,964,847

UNITED STATES PATENT OFFICE 1,964,847

KEYLESS LOCK

Peter Roy Engler and Donald P. Fries, Tulsa, Okla.

Application June 4, 1932, Serial No. 615,434
Renewed October 19, 1933

1 Claim. (Cl. 40—125)

This invention relates to a keyless lock which is mainly designed for fastening the licence plate of a motor vehicle thereto though the device can be used for other purposes.

The general object of the invention being to provide means for fastening one part of the device to another in such a manner, that the device must be broken in order to remove the parts after they are once placed together.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views and in which:—

Figure 1 is a view of the license plate showing two of the fasteners for holding it on a vehicle.

Fig. 2 is a face view of the device.

Fig. 3 is a side view thereof.

Fig. 4 is a sectional view through the device.

Fig. 5 is a view of the spring.

Figs. 6 and 7 are sectional views showing a modification, Fig. 7 being taken on the line 7—7 of Fig. 6.

In this drawing, the latter A indicates a license plate and the letter B indicates the improved fasteners for holding the license plate to a part of the motor vehicle in such a manner that the devices must be so damaged in removing the plate, that one can quickly tell that the plate has been removed by an unauthorized person.

Each device comprises a hollow body 1 and a head 2 having a stem 3, the free end of which is pointed as shown at 4. A hollow member 5 is formed with the cover part 6 of the body 1 and is located on the inner face thereof and has side notches 7 at its points of junction with the cover member.

A split spring 8 is located in the hollow body 1 with an opening 9 in the spring which is intersected by the split. Thus the shank or stem 3 can be pressed through a hole in the cover part 6 and its point entering the opening 9 will force the spring 8 to a position where the head can enter and then as the head passes beyond the opening 9 the spring will retract, so that the walls of the opening 9 will engage the reduced part of the shank between the body part thereof and the point, and thus the shank is locked in position as clearly shown in Fig. 4. The head is formed with the conventional shell or cover as shown in Fig. 4 and I prefer to place on the outer face of the head the same figures as those carried by the license plate, and also the name of the State or other data as shown in Figs. 1 and 2.

Of course, the cover plate 6 is welded or otherwise firmly fastened to the body 1, so that it will be impossible to remove it after the parts are assembled and as will be seen, after the shank 3 has been pressed into place the parts are locked and it will be impossible to separate them without seriously damaging the parts.

The modification shown in Figs. 6 and 7, show an arrangement whereby the body part 1' may be formed of lead or the like, and a chamber forming member 9' has the body surrounding the same, and in this case the member 9' is soldered or otherwise fastened to the member 5. In other respects, this form of the invention is similar to that just described.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention, what I claim as new is:—

A device of the class described comprising a body part having a closed chamber therein, one wall of the chamber having an opening therein, a split spring substantially of ring shape located in the chamber and having a hole therein which is intersected by the split and in alinement with the first-mentioned opening, a head or button having a shank formed with a point and reduced part adjacent the point whereby when the shank is forced through the first-mentioned opening, it will pass through the hole in the spring, forcing the ends of the spring apart and then said ends will snap onto the reduced part for locking the shank to the body, and a sleeve located in the body and having notches therein through which the ends of the spring pass, said sleeve receiving the head or point of the shank.

PETER ROY ENGLER.
DONALD P. FRIES.